United States Patent [19]
Torphammar et al.

[11] 3,942,740
[45] Mar. 9, 1976

[54] SAFETY BELT RETRACTOR ASSEMBLY

[76] Inventors: Nils G. Y. Torphammar; Per G. Torphammar, both of Ostermalmsu, 6, 61200 Finspong, Sweden

[22] Filed: June 12, 1974

[21] Appl. No.: 478,596

[52] U.S. Cl. ........................................ 242/107.4 B
[51] Int. Cl.² ...................... B65H 75/48; B60S 9/00
[58] Field of Search............... 242/107.4; 280/150.5; 297/386–388

[56] References Cited
UNITED STATES PATENTS

| | | | |
|---|---|---|---|
| 3,480,228 | 11/1969 | Ulert | 242/107.4 |
| 3,695,545 | 10/1972 | Peters | 242/107.4 |

*Primary Examiner*—Leonard D. Christian
*Attorney, Agent, or Firm*—Eric Y. Munson

[57] ABSTRACT

A safety belt retractor assembly adapted for use in connection with automobile seat or shoulder belts providing normally desired freedom of movement to a wearer during normal driving with the belt snagged into a locked passenger retaining position upon a rapid change of speed or direction of the vehicle. A belt is wound on a spring biased rotatable drum, the spring tending to rotate the drum to wind the belt thereon. At relatively constant speed and direction, the belt may readily be unwound from the drum. However, upon a rapid change of direction or speed, ratchet teeth associated with the drum are engaged by a pawl preventing drum rotation and holding the belt tightly. A spring normally biases the pawl to a position out of engagement with the ratchet teeth. However, the spring biasing is overcome and the pawl is actuated to a ratchet engaging drum locking position by a sudden pull on the belt when a wearer is suddenly moved as a result of a rapid speed and direction changes.

4 Claims, 4 Drawing Figures

SAFETY BELT RETRACTOR ASSEMBLY

BACKGROUND OF THE INVENTION

This invention relates to the art of safety belts, and more particularly to an improved retractor assembly for safety belts adapted for use as lap or shoulder restraining belts in motor vehicles.

The use of such automobile seat and shoulder belts though generally recognized as minimizing injury in vehicle collisions is resisted by many drivers because of the discomfort encountered in the use of these belts. Among the primary causes of discomfort is the fact that the wearer is restricted in movement not only during a collision, but also during normal driving.

BRIEF DESCRIPTION OF INVENTION

It is with the above considerations in mind that the present improved safety belt retractor assembly has been evolved, permitting the safety belt to be freely extended and retracted during normal driving, providing a desired degree of freedom of movement to the wearer, but snagging to a locked position in the event of a sharp change of speed or direction.

It is accordingly among the primary objects of the invention to provide a safety belt retractor assembly which will permit the wearer to move about to the extent normally desired during normal driving, but which snags to a locked position when the vehicle is subjected to rapid changes of speed or direction, such as occurs during a collision.

A further object of the invention is to provide an improved safety belt retractor assembly which is simple of manufacture and maintenance.

These and other objects which will appear hereafter are attained by training a belt around a spring biased rotatable drum with the spring biasing the drum to wind the belt thereabout. A ratchet wheel is secured to one end of the drum and a pawl is positioned to engage the ratchet teeth preventing rotation of the drum upon a rapid change of direction or speed of an automobile or the like in which the belt is employed. A pawl biasing spring normally biases the spring to a position out of engagement with the ratchet wheel teeth. A belt guide bar is secured to the pawl and the belt passes thereover. When the belt is subjected to a sudden pull the spring biasing is overcome and the pawl is moved to a ratchet engaging position.

A feature of the invention resides in the mounting of a relatively simple and inexpensive belt guide bar on the pawl to effect pawl movement into ratchet engagement upon a sudden movement of the belt.

BRIEF DESCRIPTION OF THE DRAWINGS

The specific details of the invention will be described in full, clear, concise and exact terms in conjunction with the accompanying drawings, wherein.

DESCRIPTION OF PREFERRED EMBODIMENTS

Referring now more particularly to the drawings, like numerals in the various FIGS. will be employed to designate like parts.

Figure 1:
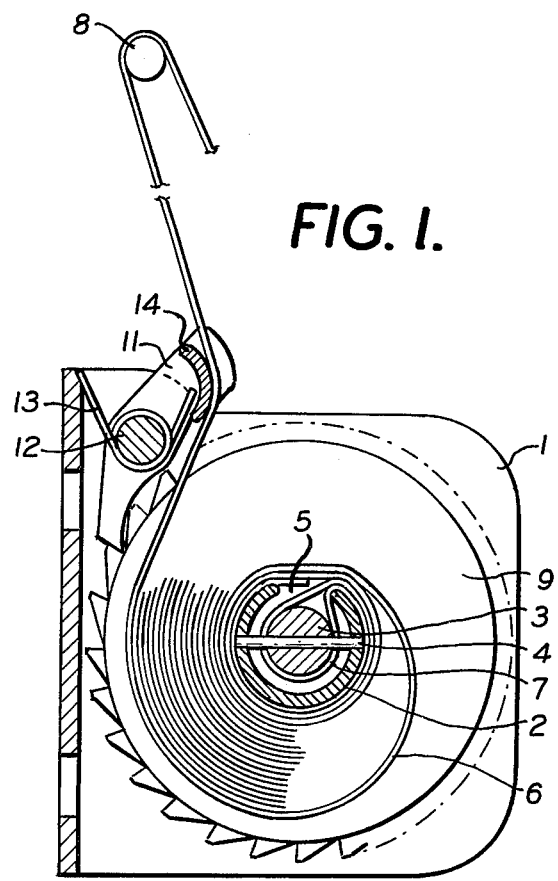
FIG. 1 is a schematic view of the interior of the belt retractor assembly with parts broken away showing the belt, drum, ratchet teeth, and pawl.
Figure 3:
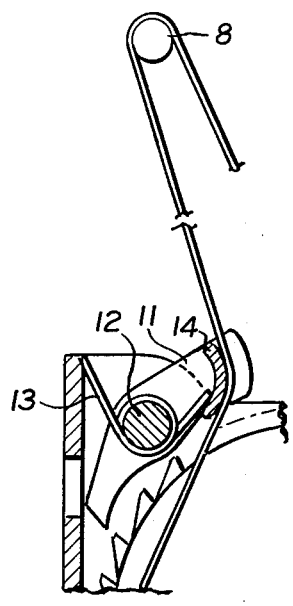
FIG. 3 is a detail elevational view of the pawl and ratchet in its unlocked position.
Figure 2:
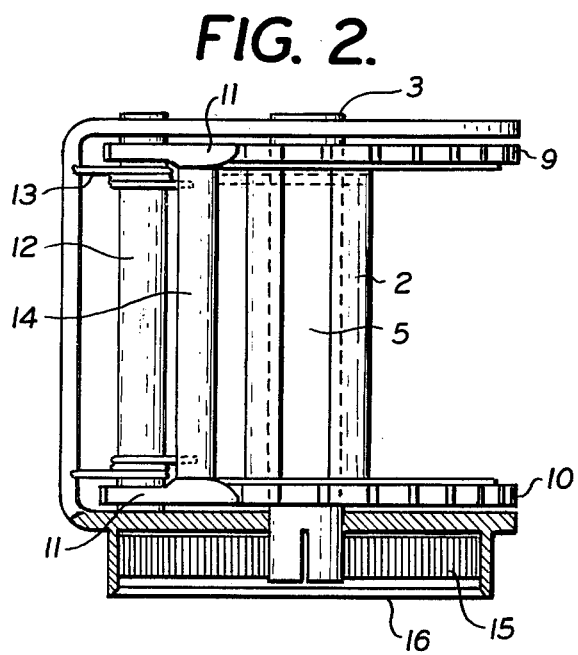
FIG. 2 is a view at right angles to the FIG. 1 view looking down at the retractor assembly shown in FIG. 1.

As best seen in FIGS. 1–3, the safety belt retractor assembly embodying the invention is formed with a housing 1 in which a hollow drum 2, as best seen in FIGS. 2 and 3 is mounted on a rotatable shaft 3 rotatably supported between the side walls of the housing 1 as best seen in FIG. 2. A pin 4 secures drum 2 to shaft 3 for rotation therewith.

The hollow drum 2 is formed with a slot 5, and the belt 6 has one end secured with respect to the drum 2 by inserting a looped belt end 7 into the drum 2 through slot 5. Shaft 3 is inserted through the looped belt 7 and drum. The belt end, drum and shaft are locked together by means of pin 4, as best seen in FIG. 1. As a result of this arrangement, the belt may be replaced when worn.

The belt is trained over a belt guide 8 fixed at a distance from housing 1 and positioned to insure the movement of the belt over the pawl.

Ratchet teeth are associated with the drum to permit control of drum movement. In accordance with the invention, ratchet wheels 9 and 10 as best seen in FIGS. 1 and 2 are fixed to the drum 2. Pawls 11, as best seen in FIG. 2 are pivoted on shaft 12 in housing 1 for engagement with the teeth of ratchet wheels 9 and 10.

A pawl biasing spring 13 is arranged to bias the pawls 11 away from the teeth of ratchet wheels 9 and 10. As illustratively shown, spring 13 is wound around pawl shaft 12 with one spring end bearing against the housing wall and the other bearing against a belt guide bar 14 arranged on the pawl. In the FIGS. 1–3 embodiment, as illustrated, the pawl is formed as a class I lever pivoted at its center. The spring arm contacting the belt guide bar 14 as seen in FIGS. 1 and 3 exerts a clockwise force on the pawl arm above the pivot moving the ratchet engaging pawl end away from the ratchet wheel teeth. The spring is selected with a spring modulus such that the pawl biasing force exerted by the spring is sufficient to maintain the pawl away from the ratchet wheel teeth as the belt slides over the belt guide bar 14 during normal movement of a passenger wearing the belt. However, upon a sudden jerk of the belt, as would occur in the event of sudden braking or a collision, the belt force on the pawl 11 must be such as to overcome the biasing of spring 13.

A drum biasing torsion coil spring 15, as best seen in FIG. 2 is mounted in spring housing 16 at one end of housing 1. The outer end of spring 15 is anchored to spring housing 16 and the inner end of spring 15 is secured to drum shaft 3. The spring 15 is tensioned to resist the unwinding of the belt from the drum.

Figure 4:
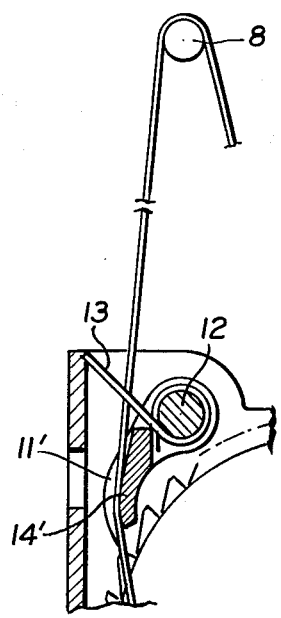
FIG. 4 is a detail elevational view of a modified pawl.

The pawl is shown in a modified form in FIG. 4, wherein pawl 11' is in the form of a class II lever pivoted at one end. The belt guide bar 14' is arranged on the same side of the pivot 12 as the ratchet engaging leg of the pawl. Spring 13, as in the FIGS. 1–3 embodiments acts to bias the pawl to a position out of ratchet tooth engagement.

OPERATION

In use, the belt retractor assembly may be used in connection with automobile safety belts by positioning the assembly either adjacent an automobile seat for lap belts or seat back for shoulder belts. A belt guide rod 8 of a length preferably at least equal to the width of the belt such as to support a belt trained thereover, is positioned adjacent the housing to provide a belt path as illustrated in either FIG. 1 or FIG. 4, depending on the embodiment employed.

During normal driving, the spring 13 will bias the pawl to a position remote from the ratchet wheel teeth and the belt may be unwound from the drum 2 resisted only by the force of drum biasing spring 15, which is selected of a spring modulus such that the belt can be unwound from the drum as a result of the forces exerted thereon by a user of the belt desiring to move about with the belt in position.

When the vehicle is subjected to rapid retardation or a sudden change of direction such as might occur in the event of collision and the passenger is suddenly thrown against the belt, the sudden tension on the belt will cause the belt to pull against the belt guide bar 14 or 14' on the pawls 11 or 11'. This sudden force will be sufficient to overcome the pawl biasing forces exerted by spring 13, which has been selected of a spring modulus such that the spring will give way to a sudden belt force. As a result, pawls 11 or 11' will be moved into engagement with the teeth of ratchet wheel 9 preventing rotation of drum 2, and the belt will be locked.

Thus, the belt wearer will be provided with freedom to make the relatively slow movements normally made by a vehicle passenger in moving to adjust a radio or heater, or to change position for comfort. However, when the passenger is jolted by a sudden change of speed or direction tending to suddenly throw the passenger laterally or forward; the belt will be locked into a passenger restraining position.

The above disclosure has been given by way of illustration and elucidation, and not by way of limitation, and it is desired to protect all embodiments of the herein disclosed inventive concept within the scope of the appended claims.

What is claimed:

1. A safety belt retractor assembly for maintaining a relatively loose tension on a safety belt during normal conditions, but locking the belt when the user is subjected to a sudden movement, said assembly comprising: a rotatable drum on which the belt is wound; a drum biasing spring urging the drum in a belt winding direction; ratchet teeth associated with the drum and rotating therewith; a pivotally mounted pawl movably positioned to engage said ratchet teeth; a pawl bearing spring urging said pawl in a direction out of engagement with said ratchet teeth; a belt guide bar connected to said pawl over which the belt is trained exerting a force opposed to the pawl spring biasing force, said pawl spring having a spring modulus such that it will resist the forces exerted by the belt as a result of relatively slow belt movement over the belt guide bar, but gives way when the belt is subjected to a sudden pull, whereby upon a sudden pull on said belt, said pawl will engage said ratchet teeth to prevent drum rotation and lock the belt.

2. A belt retractor assembly as in claim 1 in which said ratchet teeth are formed on a ratchet wheel attached to opposed ends of said drum.

3. A safety belt retractor assembly for maintaining a relatively loose tension on a safety belt during normal conditions, but locking the belt when the user is subjected to a sudden movement, said assembly comprising: a rotatable drum on which the belt is wound; a drum biasing spring urging the drum in a belt winding direction; ratchet teeth associated with the drum and rotating therewith; a pawl movably positioned to engage said ratchet teeth; a pawl bearing spring urging said pawl in a direction out of engagement with said ratchet teeth; a belt guide bar connected to said pawl over which the belt is trained exerting a force opposed to the pawl spring biasing force, said pawl spring having a spring modulus such that it will resist the forces exerted by the belt as a result of relatively slow belt movement over the belt guide bar, but gives way when the belt is subjected to a sudden pull, whereby upon a sudden pull on said belt, said pawl will engage said ratchet teeth to prevent drum rotation and lock the belt; said pawl being pivotable about a central point with said belt guide bar secured to said pawl on one side of the pivot point and the ratchet engaging end of the pawl formed on the other side of the pivot point.

4. A safety belt retractor assembly for maintaining a relatively loose tension on a safety belt during normal conditions, but locking the belt when the user is subjected to a sudden movement, said assembly comprising: a rotatable drum on which the belt is wound; a drum biasing spring urging the drum in a belt winding direction; ratchet teeth associated with the drum and rotating therewith; a pawl movably positioned to engage said ratchet teeth; a pawl bearing spring urging said pawl in a direction out of engagement with said ratchet teeth; a belt guide bar connected to said pawl over which the belt is trained exerting a force opposed to the pawl spring biasing force, said pawl spring having a spring modulus such that it will resist the forces exerted by the belt as a result of relatively slow belt movement over the belt guide bar, but gives way when the belt is subjected to a sudden pull, whereby upon a sudden pull on said belt, said pawl will engage said ratchet teeth to prevent drum rotation and lock the belt; said pawl being pivotable about a point located at one end thereof with said guide bar and the ratchet engaging end of the pawl being arranged on the same sides of the pivot point.

* * * * *